Nov. 4, 1969  E. AUCKTOR  3,475,924
UNIVERSAL JOINT
Filed Aug. 1, 1968  5 Sheets-Sheet 1

INVENTOR.
ERICH AUCKTOR
BY
Nolte & Nolte
ATTORNEYS

Nov. 4, 1969    E. AUCKTOR    3,475,924
UNIVERSAL JOINT
Filed Aug. 1, 1968    5 Sheets-Sheet 2

INVENTOR.
ERICH AUCKTOR
BY
Nolte and Nolte
ATTORNEYS

Nov. 4, 1969  E. AUCKTOR  3,475,924
UNIVERSAL JOINT
Filed Aug. 1, 1968  5 Sheets-Sheet 4

INVENTOR
ERICH AUCKTOR
BY Nolte & Nolte
ATTORNEYS

Nov. 4, 1969  E. AUCKTOR  3,475,924
UNIVERSAL JOINT
Filed Aug. 1, 1968  5 Sheets-Sheet 5

INVENTOR
ERICH AUCKTOR

BY Nolte & Nolte
ATTORNEYS

United States Patent Office 3,475,924
Patented Nov. 4, 1969

3,475,924
UNIVERSAL JOINT
Erich Aucktor, Offenbach (Main), Germany, assignor to Lohr & Bromkamp G.m.b.H., Offenbach (Main), Germany
Continuation-in-part of application Ser. No. 567,924, July 26, 1966. This application Aug. 1, 1968, Ser. No. 749,462
Int. Cl. F16d *3/34*
U.S. Cl. 64—21                                    19 Claims

ABSTRACT OF THE DISCLOSURE

A universal constant velocity sliding joint with inner and outer joint members and a circular row of ball members situated between the joint members, the joint members normally occupying a central position from where they may be axially displaced with respect to each other against a progressively increasing force which tries to return the same to their normal central position, the force being produced by cooperation of specially designed grooves in the inner and outer joint members and the ball members received therein.

BACKGROUND OF THE INVENTION

The present invention application is a continuation-in-part application of my copending application Ser. No. 567,924, filed July 26, 1966, now Patent No. 3,394,855, and entitled "Universal Joint."

The present invention relates to universal joints.

As is well known, universal joints are used for transmitting rotary movement from one tarnsmission element, such as a drive shaft, to another transmission element, such as a driven shaft, these elements rotating in the same direction but being capable of assuming different angular positions relative to each other as a result of the properties of the universal joint.

The invention relates particularly to constant velocity telescopic or sliding joints of the type where the torque is transmitted by way of ball members situated in longitudinally extending grooves of inner and outer joint members which are suitably connected to the elements between which the rotary motion is to be transmitted.

In joints of this type, the joint members are not only tiltable with regard to each other, but one joint member is also axially slidable or displaceable, or shiftable relative to the other joint member in the direction of the axis of said other joint member. For this purpose, the surface of the other joint member, in which the grooves are provided, may be of cylindrical configuration. However, it is sufficient if the outer and inner joint members are spaced such that relative shifting or sliding movement is permitted. Joints of this type are disclosed in U.S. Patent 3,067,595 of Henry Faure and U.S. Patent 3,218,827 of the applicant.

Such structures are used, for example, in units where a pair of universal joints are interconnected by a rigid intermediate member, such as an intermediate shaft.

With assemblies of this latter type, in order to increase the extent to which the structure can be shifted, it is preferred to use, instead of one shiftable and one non-shiftable universal joint, two shiftable universal joints, so that the extent of shifting provided by the joint assembly will equal the total of the extent of shifting movement of both universal joints. One of the problems encountered with structures of this type, however, resides in the fact that the intermediate member "floats," which is to say that unless special measures are taken the position of the intermediate member is undetermined since both of its ends are freely movable. Therefore, if special steps are not taken, the intermediate member, which may by chance be in any unstable position, will be subjected to the influence of inertia or other exterior forces so as to wander to an end position which in general is undesirable for the operation of the joint since it is unsuitable for transmission of the rotary forces and also results in a high degree of wear.

The wearing away of the structure will also take place to an undesirable extent, even without wandering of the intermediate member toward an end position, in the case where the intermediate member, for example as a result of different qualities in the manufacture of the grooves and different degrees to which the ball members are clamped, periodically "dances" axially about a predetermined and in some cases changing unstable bearing point. As a result of these drawbacks the joint soon becomes worn to such an extent that there is an undesirable large degree of play between the components of the joint and, in a manner which is not capable of being observed, the joint will have only a small life of practical utility.

As expedients relied upon to avoid the latter drawbacks, it is known to exert on the intermediate member of the joint a restoring force which seeks to return the intermediate member to a central, normal position after the member wanders away from this latter position under the influence of certain disturbing axial forces.

When the latter type of forces which axially displace the central intermediate member from its normal position are relatively small, it is sufficient to rely for a restoring force on the elasticity of a sealing bellows which forms part of the assembly and with which the symmetrically arranged joint assembly is provided. Elastically yieldable sealing bellows are, however, only capable of being reliably used with joints which operate at relatively low speed of revolution, and where the angle between the transmission elements is relatively small. Otherwise the bellows will be damaged in a relatively short time because of excessive contraction and expansion, as well as extensive bending of the bellows.

In other known constructions, both of the joints of an assembly of the above type are provided with additional devices for determining the position of the intermediate member, these devices seeking to maintain the intermediate member at a predetermined central or normal position with respect to those components of the joints with which the intermediate member is connected. For the purpose springs are conventionally used, these springs being situated directly between components of the joints or extensions thereof, or indirectly therebetween, such as between extensions thereof and a ball cage.

Aside from the expense which is required for guiding such springs and for mounting them in the assembly, this arrangement is also suitable only for relatively small angles between the driving and driven members of the joint, because the sealing possibilities and space requirements of the joint are extremely limited and in each case are undesirably influenced. Also, the use of spring force to restore the intermediate member is unsuited for high rotary speeds, because the bending stresses which result from the high speed of rotation of the joint produce high frequencies in the spring during the tumbling movements of the joint, resulting in premature failure of the springs, which finally break under these operating conditions.

It is, therefore, a primary object of the present invention to provide a universal joint structure, of the above general type, which, however, avoids the above drawbacks.

In particular, it is an object of the present invention to provide a universal joint structure which will indeed be capable of exerting a restoring force on the joint, to its normal central axial position, without, however, encountering the difficulties set forth above.

It is still another object of the present invention to provide a universal joint structure with a pair of universal joints interconnected by an axially displaceable intermediate member, which will be capable of exerting a restoring force on the intermediate member to return the same to its normal or central position within the joint structure, without encountering the difficulties of heretofore known universal joint structures.

In particular, it is an object of the present invention to provide a structure which will solve the above problems wtihout requiring expedients such as springs, elastic sealing bellows, and the like. Thus, it is an object of the present invention to provide a construction of the above type which will operate very reliably over a long period of time, even at relatively high speeds and where the angle between the driven and the driving parts is relatively great.

In addition, it is an object of the present invention to provide a structure which is not only rugged and reliable in operation but which, in addition, is inexpensive and capable of being easily manufactured with a high degree of precision.

In accordance with the present invention, the universal joint includes an inner joint member and an outer joint member, as well as a circular row of ball members situated between the joint members. The joint members normally occupy a central operating position in which the bias is least and from where they can be displaced axially with respect to each other to other positions against a progressively increasing force trying to return the joint members to their normal central operating position.

The outer joint member has an inner surface directed toward the inner joint member, and the inner joint member has an outer surface directed toward the outer joint member, and it is between these surfaces that the row of ball members is situated.

In accordance with the present invention, the inner surface of the outer joint member is formed with groove means which receives the ball members and the outer surface of the inner joint member is also formed with groove means which receives the ball members, and these two groove means coact with the ball members to resist displacement of one of the joint members with respect to the other joint member, away from the normal operating position of the joint members, to an increasing degree as the extent of displacement increases, so that in this way there will be an automatic restoring force resulting from the coaction of the groove means of the invention with the ball members which are received therein.

SHORT DESCRIPTION OF THE DRAWING

The invention is illustrated, by way of example, in the accompanying drawings which form part of this application and in which.

DESCRIPTION OF PREFERRED EMBODIMENTS

Figures 1, 2, 3:
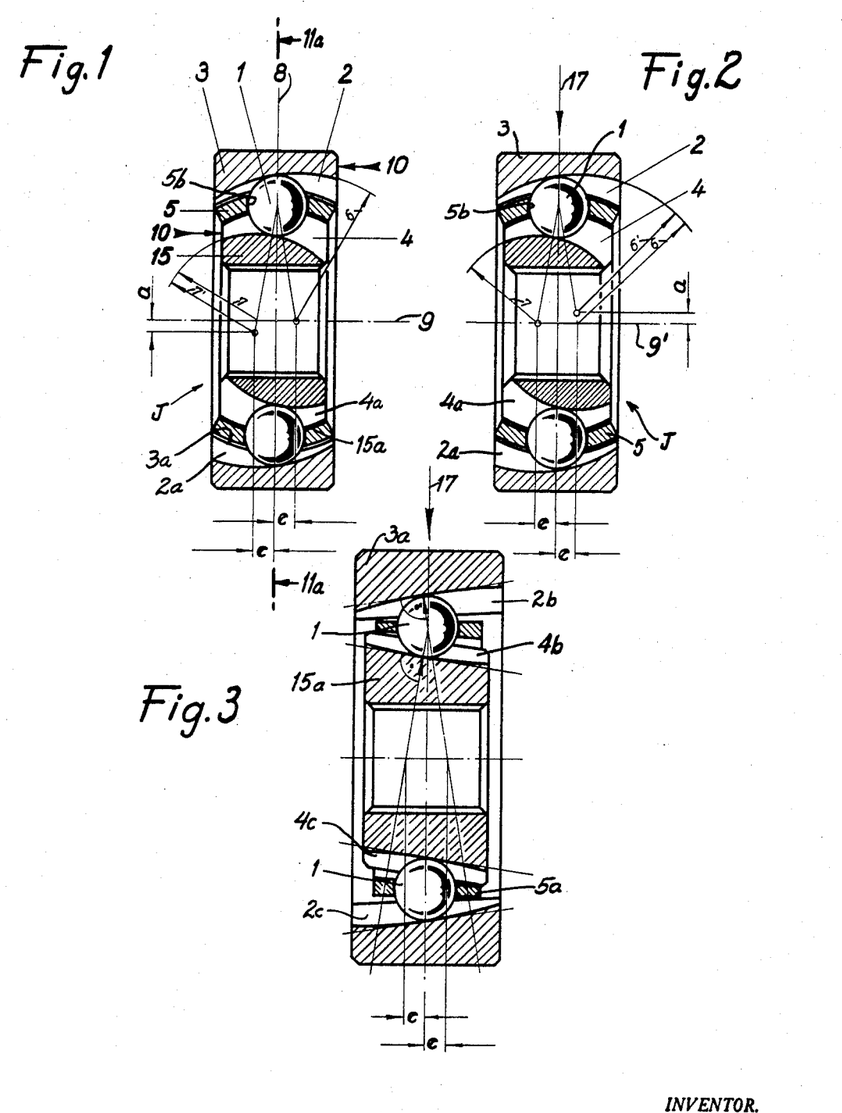
FIG. 1 is a longitudinal section through one embodiment of a joint according to the invention, the joint being shown in its normal central operating position, the section being taken in a plane which includes the axis of the joint.
FIG. 2 is a longitudinal section through another embodiment of the invention.
FIG. 3 shows a longitudinal section through still another embodiment according to the present invention.
Figure 4:
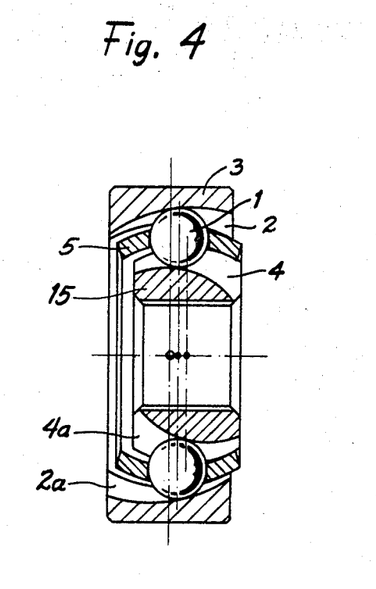
FIGS. 4 and 5 show the joints of FIGS. 1 and 3, respectively, in axially displaced condition.

Referring now to FIG. 1, the universal joint J of the invention which is illustrated therein includes a circular row of ball members 1, of which only two are visible in FIG. 1. The joint includes an outer joint member 3, and an inner joint member 15. From the normal central operating position of the joint, which is shown in FIG. 1, the joint members 3 and 15 are shiftable relative to each other to a small extent in opposite directions away from the normal central operating position for instance into the position shown in FIG. 4. In this normal position the centers of all ball members 1 lie in a central plane 8. The outer joint member 3 has an inner spherical surface 3a directed toward the inner joint member 15 and is formed with groove means for receiving the ball members 1. Two grooves 2 and 2a of the groove means of the joint member 3 are shown in FIG. 1 receiving one ball member 1 each. Additional grooves 2, 2a are distributed about the axis 9 and respectively receive the ball members 1. Each successive pair of grooves 2 are respectively directed in opposite directions, as described below. The inner joint member 15 has an outer spherical surface 15a directed toward the outer joint member 3 and spaced from the later, and this outer surface of the inner joint member is formed with the groove means which includes a plurality of grooves 4, 4a, one each of which is visible in FIG. 1 receiving one each of the ball members 1. As is apparent from FIG. 1, the grooves 2 and 4 of the groove means of the pair of joint members 3 and 15, respectively, extend between the opposed end faces of the joint members 3 and 15. While the grooves 2, 2a and 4, 4a are shown in FIG. 1 to extend from one end face all the way to the other, it is of course also possible that the grooves end short of the end faces of the joint members.

Figure 7:
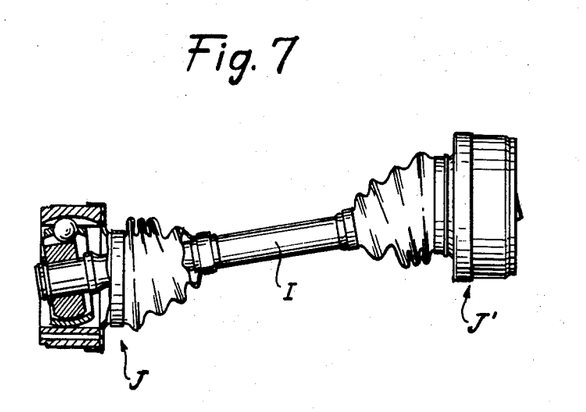
FIG. 7 shows, partly in section and partly in view, a complete joint assembly with two universal joints according to the invention and a rigid intermediate member interconnecting the same.

As is apparent from FIG. 1, the grooves 2, 4 and 2a, 4a are directed toward each other so as to respectively form a pair of grooves which define a tapered or wedge-shaped cavity in which one ball member 1 each is situated. Successive pairs of tapered cavities formed by the successive pairs of aligned grooves 2, 4 and 2a, 4 are oppositely directed, respectively so that while one pair of grooves 2 and 4, such as that shown in the upper portion of FIG. 1, forms a tapered cavity whose right end is wider than its left end, the next adjoining pairs of grooves form tapered cavities whose wide ends are situated at the left end faces of the members 3 and 15, as for instance, the one shown in the lower portion of FIG. 1 formed by grooves 2a, 4a. In this way, the successive tapered cavities which respectively receive the successive ball members alternately extend in opposite directions around the axis 9. The joint J shown in FIG. 1 forms part of an assembly (shown in FIG. 7) which includes another identical joint J and which includes an intermediate member I with respect to which the outer rings 3 are shiftable, so that in this way a shiftable universal joint assembly of the type referred to above is provided.

As is apparent from FIG. 1, the grooves 2, 2a and 4, 4a are curved so that the base of each groove 4, 4a is convex and directed toward a concave base of each groove 2, 2a. The grooves 2, 2a and 4, 4a extend along circles and respectively have radii of curvature 6 and 7'. The centers of the radii 6 and 7' are respectively situated at equal distances e from and on opposite sides of the central plane 8 which is perpendicular to the axis 9 and which includes the centers of the row of ball members 1.

In shape the longitudinal grooves are arcuate, the radii 6, 7' of the grooves 2, 4, respectively, being at the same distance e from the central plane 8. If the starting points of the two radii 6, 7 lie on the axis 9 of rotation of the joint members 3, 15, the biasing of the ball members 1 is the same in all positions of the joint. However, if the inner radius is increased to the radius 7'—i.e., if the start of the radius is shifted below the axis 9 by an amount a—biasing of the ball members 1 increases as the joint moves out of the central plane 8. Consequently, an axial force 10 is required to force the joint from the central plane 8, and when the force 10 ceases, the joint tends to move back into the position 8.

The particular changing stress which acts on the separate ball members 1 which move along the axially extending grooves 2, 2a and 4, 4a during displacement of the joint from its normal position of FIG. 1, is immaterial because it is the total stress which acts on all of the ball members 1 which determines the restoring force. When the joint is displaced from its normal operating position shown in FIG. 1 to the position shown in FIG. 4, the value of the total stress resulting from coaction of the groove means with the ball members increases as the cross-sectional area of the grooves which receive the ball members becomes progressively smaller. Therefore, when the force which displaces the joint from its normal position stops acting, the joint of the invention will automatically return to the normal position in plane 8 shown in FIG. 1.

According to the embodiment of the invention which is illustrated in FIG. 2, the same result is achieved by reducing the distance between the pairs of coacting grooves 2, 4 and 2a, 4a, not by displacing the radius of each groove 4, or 4a with respect to the axis 9 by the distance a, but rather by displacing the radius of the grooves 2, 2a from the axis 9 in an opposite direction by the distance a, so that in this case the grooves 2, 2a, respectively, have radii 6' whose centers are situated at the distance a from the axis 9, as indicated in FIG. 2. Otherwise the embodiment of FIG. 2 is the same as that of FIG. 1.

Of course, it is also possible to achieve the same results by narrowing the distance between the pairs of coacting grooves 2, 4 and 2a, 4a in any other way, such as by splitting the distance a between the radii of the grooves of the two groove means, so that, for example, the radii of the grooves 4 have their centers respectively situated at one half the distance a on one side of the axis 9 while the radii of the grooves 2 respectively have their centers situated at the other side of the axis 9 by one half the distance a.

Figure 5:
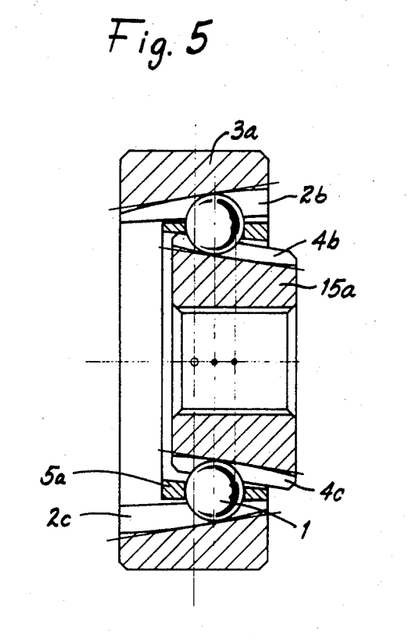

FIG. 3 shows an embodiment where the pairs of aligned grooves 2b, 4b and 2c, 4c of the two groove means of the joint members 3a and 15a also define tapered cavities for receiving the ball members, with the successive tapered cavities being oppositely directed, as exemplified by the cavities in the upper and lower portion of FIG. 3. However, in the case of FIG. 3 the pairs of grooves 2b, 4b and 2c, 4c which respectively receive the ball members are substantially straight. If the grooves were actually absolutely straight then they would respectively have radii which were infinitely long, and the effect of the invention, according to which the grooves press with increasing force against the ball members as the extent of displacement from the normal position of the joint increases, would not be achieved. In order to achieve this effect of the invention the grooves of the embodiment of FIG. 3 are made almost straight by providing them with relatively long radii of curvature which provide the grooves with concave base surfaces directed toward each other and slightly curved in the manner shown in FIG. 3. With this construction, as the extent of displacement from the normal position of the joint increase (as shown in FIG. 5) the force resisting displacement from the normal position also increases. In this case the centers of the radii are situated on straight lines which are normal to the tangents between the ball members 1 and grooves at the bases of the latter, as indicated in FIG. 3. It is furthermore to be noted that with the embodiment of FIG. 3, instead of making the grooves of both groove means of the slightly curved configuration shown in FIG. 3, it is possible to maintain the grooves of one of the groove means straight and to provide a curvature only for the grooves of the other of the groove means, similar to the embodiment of FIGS. 8 and 9.

Figures 11, 11A:
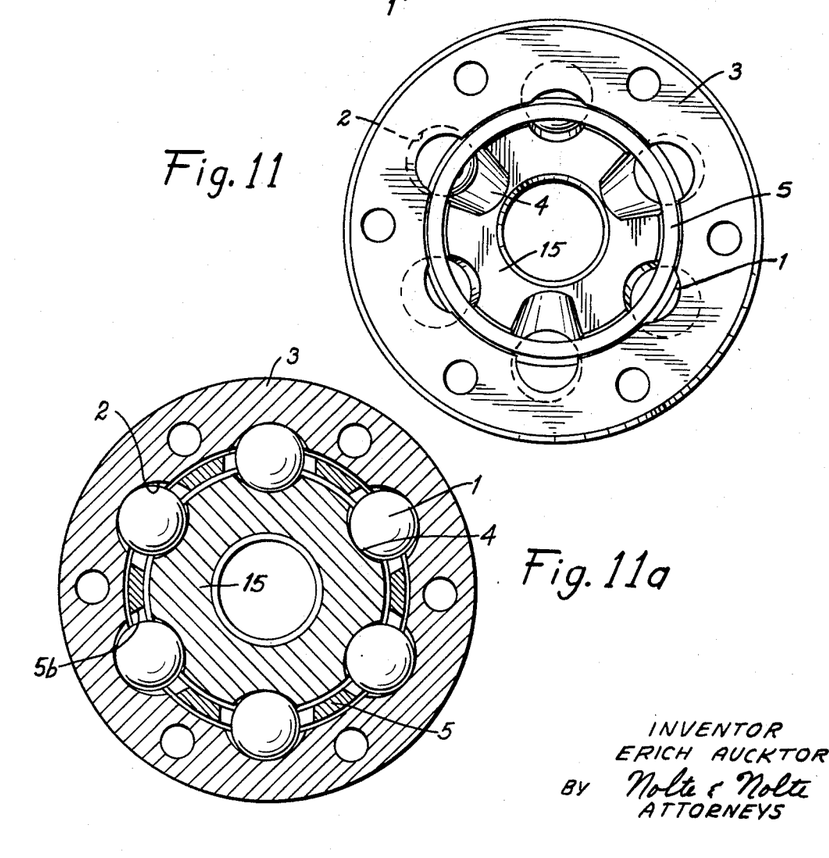
FIG. 11 is a side view of the joint of FIG. 1 as seen in the direction of the arrow 10.
FIG. 11a is a section taken along line 11a—11a of FIG. 1.
Figure 12:
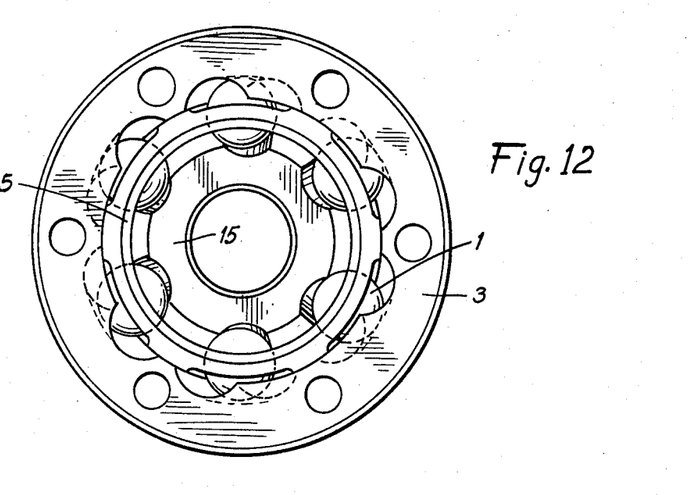
FIG. 12 is a side view of an embodiment of the joint according to the invention as illustrated in FIGS. 8 and 10.

In the embodiments of FIGS. 1, 2 and 3 the circular row of ball members 1 is received in a cage, such as the cage 5 indicated in FIGS. 1 and 2, or cage 5a in FIG. 3. The openings in the cage are elongated in circumferential direction as shown in FIG. 11a at 5b, illustrating a different embodiment of the joint according to the invention, so that the balls can move in circumferential direction when the joint is shifted. The shifting of the joint members relative to each other is possible due to the fact that the cage is spaced from both the outer and inner joint members when said joint members are in the normal position shown in FIGS. 1 to 3. Upon axial displacement of one joint member relative to the other, the cage finally abuts against one or the other joint member and thereby prevents further displacement or shifting of the joint.

Figure 6:
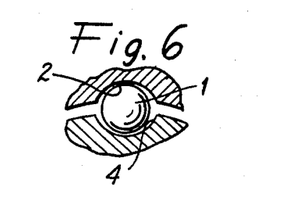
FIGS. 6, 6a and 6b diagrammatically illustrate sections through a pair of coacting groove means of the inner and outer joint members retaining a ball member therebetween of joints according to the present invention for the purpose of demonstrating the forces acting in the joint when the joint is shifted, in particular illustrating a specific effective section through the guide portion of said groove means with respect to said ball member.
Figure 6A:
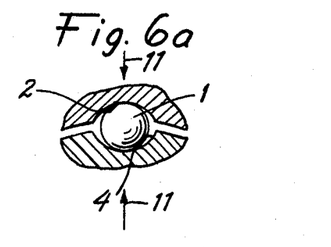

The manner in which the results of the invention are achieved with the embodiments of FIGS. 1–3 is schematically indicated in FIGS. 6, 6a. Thus, without the structure of the invention the grooves would initially have with respect to each ball member the relationship indicated in FIG. 6. However, with the structure of the invention either one or both of the groove means with grooves 2, 2a and 4, 4a are displaced with respect to each other in the direction of the arrows 11, shown in FIG. 6a, so as to narrow the distance between the grooves 2, 2a of one of the groove means with respect to the grooves 4, 4a of the other of the groove means.

It is not essential, however, to achieve the results of the invention by way of a purely radial displacement of one or both of the groove means in the direction of the arrows 11 in FIG. 6a. Instead, it is possible to provide a circumferential displacement, as indicated by the arrows 16 in FIG. 6b. It will be noted that the pair of groove means in FIG. 6b have been circumferentially displaced, as indicated by the arrows 16, and in this way it is possible also to achieve the increasing resistance to displacement of the joint from its normal position as the extent of displacement increases.

Figure 8:
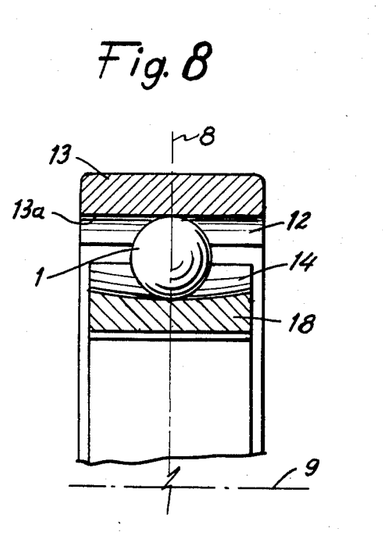
FIGS. 8 and 9 respectively illustrate the upper portions of two further embodiments of the invention, in section, where the coacting groove means of the inner and outer joint members cross each other and the effective sections through the guide portions vary from the shown central position to a shifted position according to FIG. 6 (central position) and FIG. 6a (shifted position), with the grooves of the joint members rotated into the plane of the drawing for purposes of explanation and clarity.
Figure 9:
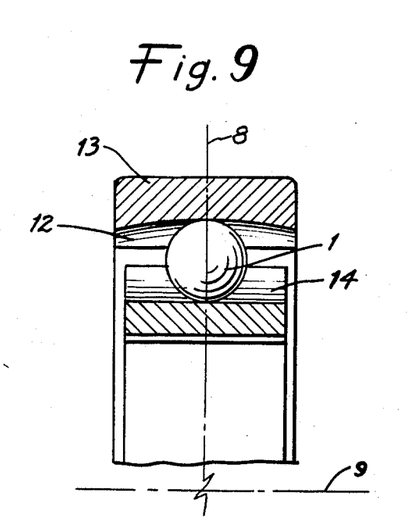

Referring now to FIGS. 8 and 9, the embodiments of the invention illustrated therein include an outer joint member 13 formed at its inner surface 13a, which is not spherical as in the embodiments of FIGS. 1 through 3 but cylindrical and directed toward the inner joint member, with a plurality of grooves 12 which extend between the end faces of the joint member 13 and which form the groove means of the outer joint member 13. The ball members 1 are respectively received in the grooves 12 of the outer groove means as well as in grooves 14 of an inner groove means formed in the outer surface of the inner joint member 18. In FIGS. 8 and 9, the joint members 13 and 18 are shown in their normal operating position where the centers of the circular row of ball members 1 lie in the central normal plane 8. The grooves 12 are equal in number to the grooves 14 and form therewith pairs of grooves for respectively receiving the several ball members 1. This embodiment in this respect equals embodiments according to U.S. Patent 3,218,827 of the applicant.

Figure 10:
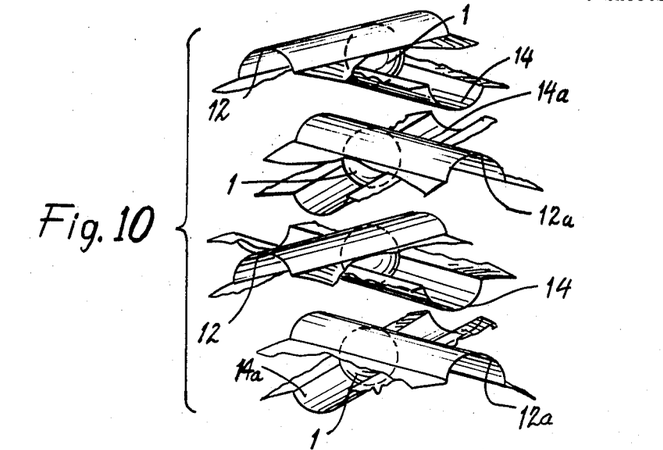
FIG. 10 is a partial development of the inner and outer joint members of the embodiment of FIG. 8, to show the relative arrangement of the grooves in the joints.

In both of the embodiments of FIGS. 8 and 9 the grooves 12 cross over the grooves 14 which are respectively inclined oppositely to the direction of inclination of the grooves 12, as more clearly visible in the development of FIG. 10. The planes in which the grooves 12, 14 are located are turned into the common planes of FIGS. 8 and 9 for convenience and clarity of illustration. Furthermore, although the ball members of FIGS. 8 and 9 are not shown in a cage, cages may be provided for the ball members. In addition each pair of successive grooves 12, 12a are oppositely inclined, one with respect to the other, so that the successive grooves 12, 12a as they are circumferentially distributed around the joint member are successively inclined oppositely. The same is of course true of grooves 14, 14a which will have one groove 14 inclined oppositely to the next groove 14a, with the several grooves 14, 14a being oppositely inclined to the several grooves 12, 12a toward which they are respectively directed. The grooves 12, 12a of the embodiment of FIG. 8, or the grooves 14, 14a of the embodiment of FIG. 9, can extend tangentially with respect to a cylinder whose axis coincides with the axis 9, or these grooves can extend spirally along the exterior surface of such a cylinder. Instead of forming part of a spiral which extends along a cylinder, it is also possible to give these grooves a spiral configuration with respect to any other surface of revolution or the grooves can extend tangentially with respect to any other surface of revolution, such as the surface of a cone whose axis coincides with the axis 9, so that these grooves can have any other type of progressive curvature.

In order to achieve the results of the invention the grooves 14 (and 14a) of the embodiment of FIG. 8, or the grooves 12 (and 12a) of the embodiment of FIG. 9, have their bases progressively approaching the opposite grooves of the opposite joint member in a direction away from the central plane 8, so that the grooves 14, 14a of the embodiment of FIG. 8 are slightly concave to the same extent on opposite sides of the plane 8, while the grooves 12, 12a of the embodiment of FIG. 9 are slightly concave to the same extent on opposite sides of the plane 8, as indicated in FIGS. 8 and 9. As a result of this narrowing of the cavities which receive the ball members 1 results of the invention, according to which the resistance to the displacement from the normal operating position in plane 8 increases with the extent of displacement are achieved.

It is possible to provide a construction as shown in FIGS. 8 and 10, for example, in a very simple way by providing the outer joint member 13 with grooves 12, 12a of spiral configuration while the grooves 14, 14a extend tangently along straight lines which are tangent to a cylinder whose axis coincides with the axis 9; the grooves 14, 14a may be slightly curved respectively along arcs of circles or the like in predetermined planes; or these grooves 14, 14a can also form parts of lines of spiral configuration. When such grooves 14, 14a of spiral configuration is turned into the plane of FIG. 8 it will have the configuration illustrated in FIG. 8.

With the embodiment of FIG. 9, it is possible to achieve the constantly increasing resistance to displacement from the normal operating position in plane 8 in a very simple way by providing straight grooves 14 (and 14a) which extend along tangents, respectively, of a surface of revolution, while the grooves 12 (and 12a) are curved as illustrated either along arcs of circles or another constant curvature in given planes or along spirals, respectively.

Thus, with the crossing pairs of grooves 12, 12a and 14, 14a of the embodiments of FIGS. 8 and 9 and 10, the positions of the grooves with respect to each other will guarantee that in any position of the joint members 13, 18 the ball members 1 are maintained in the proper running or operating plane of the joint, and, of course, the embodiments of FIGS. 8 and 9 are equally useful with embodiments where the row of ball members 1 is situated in a suitable cage.

Figure 6B:
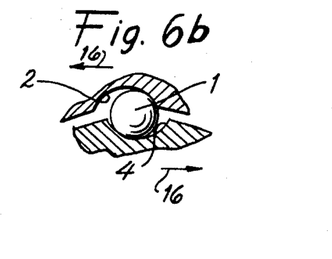
Figure 13A:
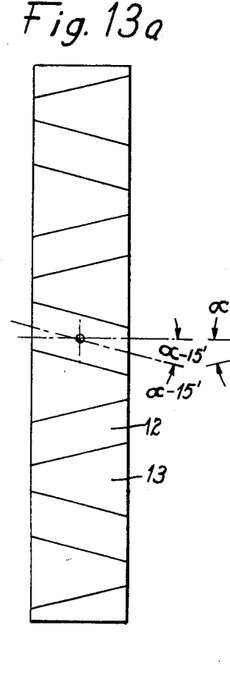
FIGS. 13a and 13b are developed views of inner and outer joint members, respectively, of a different embodiment of the invention where the groove means of the inner and outer joint members cross each other in a manner as illustrated in FIG. 10, however, the effective sections through the guide portions varying according to FIG. 6 (central position) and FIG. 6b (shifted position).
Figure 13B:
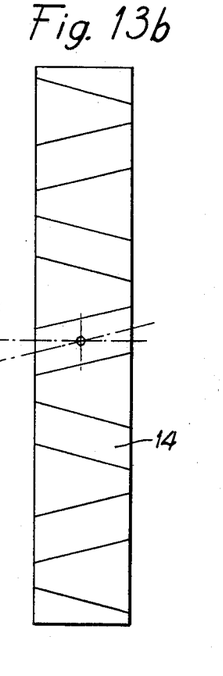

Another embodiment showing a circumferential displaced arrangement of the coacting groove means according to FIG. 6 and FIG. 6b is illustrated in FIGS. 13a and 13b with respect to a type of joint werein the coacting groove means cross each other in the manner of FIG. 10. In conventional joints of this type the angle α of groove means 12 is equal to the angle α of groove means 14, said groove means 12 and 14 coacting with each other, if the absolute values of said angles are disregarded. In order to achieve the circumferential displacement of the effective sections of the groove means according to FIGS. 6 and 6b it is only necessary to change the angle α of one of the coacting groove means, e.g., of groove means 12 as shown in FIG. 13a, by a very small value, in practical embodiments for instance by 15', as illustrated in FIG. 13a with respect to FIG. 13b.

According to the particular choice of groove construction, there will be either the narrowing distance between the pair of groove means as illustrated in FIG. 6a or the circumferential displacement of one groove means with respect to the other as illustrated in FIG. 6b or a combination of both of these displacements can be provided.

It should be noted that, while the various joints have been illustrated in positions where the inner and outer joint members are axially aligned with each other for purposes of convenience of illustration, the joints are completely operable when these joint members are arranged at an angle with respect to each other. As a matter of fact, the last mentioned arrangement is by far the most frequent construction, whereas joints in which the joint members are arranged coaxially are relatively rare.

The particular choice of a given type of groove means construction or the particular choice of a groove means construction which changes in a particular manner will be determined to a large extent by the particular manufacturing tools and manufacturing machines which are available for the manufacture of the joints of the invention, in order to provide the best possible structure at the lowest possible cost.

Of course, the joints of the invention must be manufactured in such a way that the angle included between a cooperating pair of grooves which receives a ball member is greater than the limiting friction angle, determined by the material of the groove means and the ball members, at which self-locking or jamming will take place, so that in this way, the joints will run freely and there will be no jamming due to displacement of the joint from its normal operating position.

The solution to the problem provided in accordance with the present invention is based on the observation that, for instance, in a bearing which includes rolling bodies as antifriction elements, the bearing will automatically always seek to move to that position where the pressure on the rolling bodies of the bearing is at a minimum. It has been demonstrated, for example, that an engine connecting rod mounted by way of a needle or roller bearing on a horizontally extending bearing pin will not wander axially along the bearing pin only if the bore of the connecting rod and the exterior surface of the bearing pin received in this bore are absolutely cylindrical. Even if the exterior surface of the bearing pin is only slightly tapered, or if the surface of the bore of the connecting rod is only slightly tapered, the connecting rod will automatically wander axially along the bearing pin in that direction where the rolling bodies will have the greatest amount of play.

Thus, advantage is taken of this property, in accordance with the present invention, by manufacturing the pairs of cooperating grooves of the joint members of the invention in such a way that the total of the forces with which the joint member press on the ball members, in the grooves of the joint members, constantly increases in both directions of displacement of the joint from its normal central operating position. Thus, with all of the embodiments of the invention, irrespective of the direction of movement of one of the joint members relative to the other from the normal operating position, there will be a constantly increasing resistance to such movement as the extent of this movement increases.

Of course, a number of constructive possibilities are available for the structure of the invention, as has been indicated above. Thus, either the radial displacement of FIG. 6a or the circumferential displacement of FIG 6b, or both, can be used, depending upon the particular construction, and the particular cross-sectional configuration of the grooves can remain unchanged in combination with such displacement in accordance with the invention.

Naturally, the extent of departure of the structure of the invention from conventional constructions in order to achieve the effects of the invention is relatively small. In practice it has been demonstrated that according to the particular use of the joint and the construction thereof, a variation on the order of a few thousandths of the diameter of a ball member in the change in the construction of the grooves will suffice to bring about the results of the invention. This difference in the construction of the invention, as compared to conventional constructions, can be produced by conventional manufacturing methods, such as by broaching, drilling, milling, or grinding. Preferably, the bottom of the groove forms a combination of simple arcs of different radius or curves which progress in similar manner or straight lines. Also, use may be made, either by itself or in combination with other methods, of the distortion or warping which takes place during hardening of the metal which forms the groove means of the invention. In this way, the forces acting on the ball members will increase in the desired manner as the extent of displacement of the joint from its normal operating position increases.

While various embodiments of the invention have been described above, these are to be considered as examples of the invention only, the scope of the invention being only determined by the attached claims.

What is claimed is:

1. A universal joint comprising inner and outer joint members and a circular row of ball members situated between said joint members, said outer joint member having an inner surface directed toward said inner joint member and said inner joint member having an outer surface directed toward said outer joint member, said joint members having a normal central position where said outer joint member surrounds and is spaced from said inner joint member so as to permit relative axial shifting of said joint members, said outer joint member being formed at its inner surface with groove means receiving said ball members and including a plurality of grooves each of which extends in said inner surface in longitudinal direction, said inner joint member being formed at its outer surface with groove means also receiving said ball members and including a plurality of grooves each of which extends in said outer surface in longitudinal direction, both of said groove means coacting with said ball members to resist axial displacement of one of said joint members in both directions away from said normal position with respect to the other one of said joint members to an increasing degree as the extent of axial shifting from said normal position increases.

2. A universal joint as recited in claim 1 and wherein a cage means is situated between said joint members and is formed with openings which are elongated in circumferential direction and through which said ball members respectively extend.

3. A universal joint as recited in claim 1 and wherein said grooves of said groove means of said inner joint member are respectively directed toward and aligned with said grooves of said groove means of said outer joint member to form therewith pairs of grooves which respectively receive said ball members, each pair of grooves defining a tapered, substantially wedge-shaped cavity for the ball member received therein, and each two successive pairs of grooves tapering in opposed directions, respectively.

4. A universal joint as recited in claim 3 and wherein the grooves of each pair of grooves respectively have radii of curvature whose centers are respectively situated on opposite sides of and equally spaced from a plane normal to the common axis of said joint members, when the latter are in said normal position, and including the centers of said ball members, said centers of curvature further being situated in a pair of different straight lines extending parallel to each other and parallel to the common axis of said joint members in their normal position.

5. A universal joint as recited in claim 4 and wherein one of said straight lines coincides with the common axis of said joint members.

6. A universal joint as recited in claim 3 and wherein both grooves of each pair of grooves which define a tapered cavity for a ball member are almost straight and respectively have slightly concave surface directed toward each other.

7. A universal joint as recited in claim 1 and wherein the grooves of said groove means of said outer joint member each cross the grooves of said groove means of said inner joint member at the points where the co-acting pairs of said groove means receive a ball member each.

8. A universal joint as recited in claim 7 and wherein said grooves of at least one of said groove means are successively inclined in opposite directions.

9. A universal joint as recited in claim 1 and wherein, in the normal central position of the joint members, the spacing of the grooves of all coacting groove pairs of the inner and the outer surfaces of the joint members decreases continuously in opposite directions of displacement away from the normal central position of the joint members.

10. A universal joint member as recited in claim 7 and wherein the grooves of said groove means of one poins member extend along straight lines and the grooves of said groove means of the other joint member extend along arcuate lines.

11. A universal joint as recited in claim 1 and wherein the ends of the grooves of said groove means of each of said joint members are situated at the end faces of the respective joint members.

12. A universal joint as recited in claim 2 wherein in those displaced positions of said joint members in which said joint members are axially displaced relative to each other with respect to their normal central position, the effective radial distances of the grooves of all coacting groove pairs of the inner and outer surfaces of the joint members, said effective distances clamping said ball members between the coacting grooves, decrease progressively in dependency on said displacement.

13. A universal joint as recited in claim 2 wherein in those displaced positions of said joint members in which said joint members are axially displaced relative to each other with respect to their normal central position, the effective circumferential distances of the grooves of all coacting groove pairs of the inner and outer surfaces of the joint members, said effective distances clamping said ball members between the coacting grooves, decrease progressively in dependency on said displacement.

14. A universal joint as recited in claim 3 wherein in those displaced positions of said joint members in which said joint members are axially displaced relative to each other with respect to their normal central position, the effective radial distances of the grooves of all coacting groove pairs of the inner and outer surfaces of the joint members, said effective distances clamping said ball members between the coacting grooves, decrease progressively in dependency on said displacement.

15. A universal joint as recited in claim 3 wherein in those displaced positions of said joint members in which said joint members are axially displaced relative to each other with respect to their normal central position, the effective circumferential distances of the grooves of all coacting groove pairs of the inner and outer surfaces of the joint members, said effective distances clamping said ball members between the coacting grooves, decrease progressively in dependency on said displacement.

16. A universal joint as claimed in claim 7 wherein in those displaced positions of said joint members in which said joint members are axially displaced relative to each other with respect to their normal central position, the effective radial distances of the grooves of all coacting groove pairs of the inner and outer surfaces of the joint members, said effective distances clamping said ball members between the coacting grooves, decrease progressively in depency on said displacement.

17. A universal joint as recited in claim 7 wherein in those displaced positions of said joint members in which said joint members are axially displaced relative to each other with respect to their normal central position, the effective circumferential distances of the grooves of all coacting groove pairs of the inner and outer surfaces of the joint members, said effective distances clamping said ball members between the coacting grooves, decrease progressively in dependency on said displacement.

18. A universal joint as recited in claim 8 wherein in those displaced positions of said joint members in which said joint members are axially displaced relative to each other with respect to their normal central position, the effective radial distances of the grooves of all coacting groove pairs of the inner and outer surfaces of the joint members, said effective distances clamping said ball members between the coacting grooves, decrease progressively in dependency on said displacement.

19. A universal joint as recited in claim 8 wherein in those displaced positions of said joint members in which said joint members are axially displaced relative to each other with respect to their normal central position, the effective circumferential distances of the grooves of all coacting groove pairs of the inner and outer surfaces of the joint members, said effective distances clamping said ball members between the coacting grooves, decrease progressively in dependency on said displacement.

References Cited

UNITED STATES PATENTS

| | | | |
|---|---|---|---|
| 2,618,942 | 11/1952 | Dodge | 64—8 |
| 3,067,595 | 12/1962 | Faure | 64—8 |
| 3,133,431 | 5/1964 | Zech | 64—21 |
| 3,176,477 | 4/1965 | Mazziotti | 64—21 |
| 3,218,827 | 11/1965 | Aucktor | 64—8 |

HALL C. COE, Primary Examiner